United States Patent
Shen (10) Patent No.: US 8,345,022 B2
(45) Date of Patent: Jan. 1, 2013

(54) LINEAR COMPENSATION METHOD OF TOUCH PANEL

(75) Inventor: Chang-Han Shen, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 662 days.

(21) Appl. No.: 12/633,700

(22) Filed: Dec. 8, 2009

(65) Prior Publication Data

US 2011/0134069 A1    Jun. 9, 2011

(51) Int. Cl.
 *G06F 3/041* (2006.01)
(52) U.S. Cl. .............. 345/178; 345/174; 178/18.02; 178/18.05; 178/20.01
(58) Field of Classification Search .......... 178/18.02
See application file for complete search history.

(56) References Cited

U.S. PATENT DOCUMENTS

| 8,169,413 B2 * | 5/2012 | Jin et al. ............... 345/173 |
| 2009/0066673 A1 * | 3/2009 | Molne et al. ........... 345/178 |
| 2009/0066674 A1 * | 3/2009 | Maharyta et al. ...... 345/178 |

FOREIGN PATENT DOCUMENTS

TW    I297857    6/2008

* cited by examiner

*Primary Examiner* — Lixi C Simpson (57) ABSTRACT

A linear compensation method of a touch panel is utilized to a touch control computer system. According to the method, a compensation reference table, including reference temperatures and reference surface resistances at pre-determined reference points having known coordinates at the reference temperatures, is obtained at first. Then, a set of user calibration resistance at the pre-determined reference points is obtained through a user calibration process, so as to obtain ratios of the user calibration resistances to interpolation surface resistances as correction weights. Under different temperature, interpolation surface resistances corrected by utilizing the correction weight to derive the current correction surface resistances that are corrected and nearly identical to actual surface resistances. Therefore, relatively precise coordinates are obtained through resistance-coordinate conversion process.

9 Claims, 7 Drawing Sheets

| reference temperature | surface resistances of pre-determined reference points | | | | |
|---|---|---|---|---|---|
| TX | RX-1 | RX-2 | RX-3 | RX-4 | RX-5 |
| T60=60°C | R60-1 | R60-2 | R60-3 | R60-4 | R60-5 |
| T50=50°C | R50-1 | R50-2 | R50-3 | R50-4 | R50-5 |
| T50=40°C | R40-1 | R40-2 | R40-3 | R40-4 | R40-5 |
| T30=30°C | R30-1 | R30-2 | R30-3 | R30-4 | R30-5 |
| T20=20°C | R20-1 | R20-2 | R20-3 | R20-4 | R20-5 |
| T10=10°C | R10-1 | R10-2 | R10-3 | R10-4 | R10-5 |
| T0=0°C | R0-1 | R0-2 | R0-3 | R0-4 | R0-5 |
| T-10=-10°C | R-10-1 | R-10-2 | R-10-3 | R-10-4 | R-10-5 |
| T20=20°C | R-20-1 | R-20-2 | R-20-3 | R-20-4 | R-20-5 |
| T30=30°C | R-30-1 | R-30-2 | R-30-3 | R-30-4 | R-30-5 |
| T50=40°C | R-40-1 | R-40-2 | R-40-3 | R-40-4 | R-40-5 |

(leftmost label: operating temperature range)

LINEAR COMPENSATION METHOD OF TOUCH PANEL

BACKGROUND OF THE INVENTION

1. Technical Field

The present invention relates to linear error compensation of a touch panel, and more particularly to a linear compensation method of a touch panel that enables a touch control computer system to correct errors caused by the variation of the temperature itself.

2. Related Art

A touch control display has a touch panel combined with a display panel. The touch control panel allows a user to directly touch an icon or a menu displayed on the display panel so as to rapidly operate a computer system. In fact, the user touches the touch panel disposed on the display panel, and the touch panel feeds back a positioning signal to the computer system, such that the computer system converts the positioning signal to a coordinate value and then maps the coordinate value to an image displayed by the display panel.

The categories of touch panels include resistive touch panels, capacitive touch panels, electromagnetic touch panels, etc. A has advantages that structure is simpler and cost is low. Therefore, the resistive touch panels are widely applied in a variety of portable electronic devices. In generally, a resistive touch panel includes two transparent plates with a transparent spacer disposed there-between, such that a small gap is normally kept between the two transparent plates. Transparent conductive films, for example ITO films (Indium Tin Oxide films), are disposed on surfaces of the two transparent plates facing each other. When the transparent plates on the external sides are pressed and deformed, the transparent conductive films contact each other, such that an electronic circuit of the touch module detects a surface resistance which can be resolved into two resistances in two-dimensional directions. The surface resistance is introduced in a surface resistance-coordinate conversion procedure, so as to derive a position where the transparent conductive films contact each other, i.e., a position on the touch panel.

A transparent conductive film is generally fabricated by RF sputtering, and goes through printing, inking, baking, assembling, hot stamping, and other processes during the combination with the transparent plate. The aforementioned processes always damage the uniform distribution of the transparent conductive film, such that the actual surface resistance varies and cannot match with the actual touch position. When a coordinate point of the touch panel is touched, the actually generated surface resistance is different from the preset one, and a wrong coordinate is obtained by introducing the actually generated surface resistance in the surface resistance-coordinate conversion procedure. For example, when a touch pen is used to contact the touch panel, a linear error is generated between a point of the touch pen and a position of a cursor when the cursor is moved to be below the point of the touch pen.

In the prior art, a multi-point calibration procedure is further performed to correct the surface resistance-coordinate conversion procedure, so as to implement a linear error compensation for the coordinate. Under instructions of multi-point calibration procedure software, the user sequentially touches 5, 9, or 25 pre-determined reference points with known coordinates to obtain corresponding reference surface resistances. The surface resistance-coordinate conversion procedure converts a surface resistance output from the touch panel into a corresponding coordinate based on the coordinates of the pre-determined reference points and the corresponding surface resistances thereof through interpolation, extrapolation, or a specific algorithm.

For the resistive touch panel, environmental factors, especially temperature, seriously influence the actual surface resistance. For example, the user acquires a reference surface resistance of a pre-determined reference point at 20° C. for conversion by the surface resistance-coordinate conversion procedure. The reference surface resistance of the pre-determined reference point is only suitable to be introduced in the surface resistance-coordinate conversion procedure for calculating a coordinate corresponding to a surface resistance at 20° C. If the temperature sharply varies in a short time, for example, the user walks from inside a vehicle at 20° C. to the outside at −20° C., the actual surface resistance will vary greatly. As a result, the original reference surface resistance acquired at 20° C. is no longer applicable, and the user must perform the multi-point calibration procedure again to generate a new reference surface resistance. However, for ordinary users, it is difficult to determine at what temperature difference the re-calibration is needed, and the re-calibration from time to time also brings inconvenience to the use of a touch computer device.

SUMMARY

In order to solve the problem in the prior art that the precision of a touch panel is easily influenced by temperature such that a user needs to continuously perform calibration as the temperature varies so as to eliminate the error, the present invention is directed to a linear compensation method of a touch panel which is applicable to a touch control computer system. Thereby, the touch control computer system implementing the method is capable of correcting errors caused by the temperature itself based on temperature variations without requiring the user to perform re-calibration as the temperature varies.

The present invention provides a linear compensation method of a touch panel which is applicable to a touch control computer system. The touch control computer system includes a system chipset, a central processing unit (CPU), a memory block, a display interface, a display panel, a touch panel overlaid on a front side face of the display panel, and a thermal sensor disposed on the touch panel.

According to the method, a compensation reference table stored in the memory segment is provided at first. The compensation reference table includes a plurality of sets of data, each set of data contains a reference temperature and reference surface resistances obtained for pre-determined reference points having known coordinates at the reference temperature. The CPU performs a user calibration process to obtain a user calibration temperature of the touch panel via the thermal sensor and acquire a user calibration resistance of each of the pre-determined reference points. Afterwards, the CPU finds out interpolation surface resistances corresponding to the user calibration temperature from the compensation reference table. The CPU then obtains a correction weights and records the correction weights in the compensation reference table. The correction weights are ratios of the user calibration resistances to the interpolation surface resistances. The thermal sensor obtains a current temperature of the touch panel, and the CPU obtains interpolation surface resistances corresponding to the current temperature from the compensation reference table. The interpolation surface resistance corresponding to the current temperature is corrected with the correction weight so as to obtain a current surface resistance of each of the pre-determined reference points.

In the present invention, a ratio between a interpolation surface resistance and a user calibration resistance in the compensation reference table serves as a correction weight, a interpolation surface resistance obtained from the compensation reference table at different temperatures is corrected with the correction weight so as to obtain a current surface resistance that is corrected and approaches an actual surface resistance, and the current surface resistance and a corresponding coordinate are introduced in a surface resistance-coordinate conversion procedure to acquire a precise coordinate.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
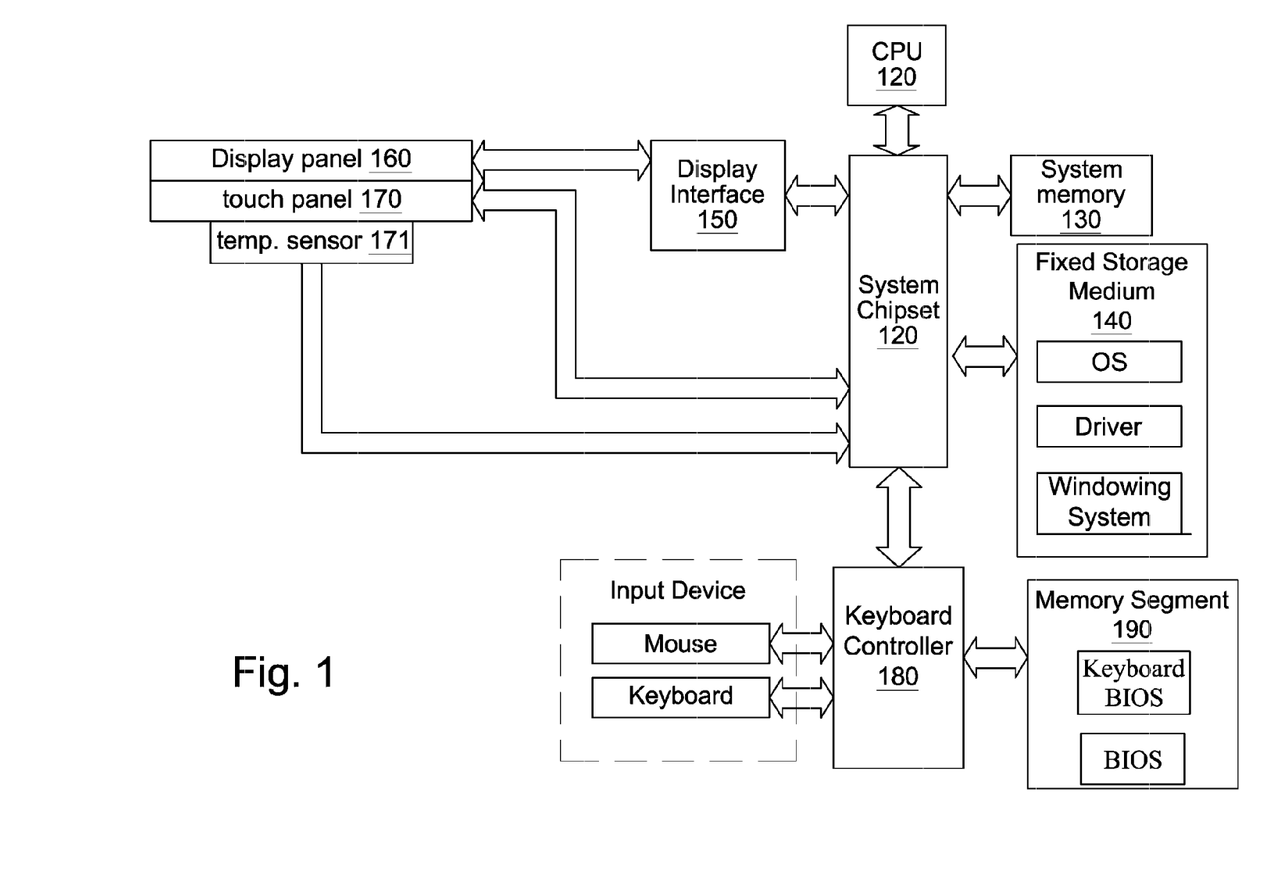
FIG. 1 is a system block diagram of a touch control computer system applying a linear compensation method of a touch panel according to an embodiment of the present invention.

FIG. 1 shows a touch control computer system applying a linear compensation method of a touch panel according to an embodiment of the present invention. The touch control computer system includes a system chipset 110, a central processing unit 120 (CPU 120), a system memory 130, a fixed storage medium 140, a display interface 150, a touch display device, a thermal sensor 171, a keyboard controller 180, and a basic input/output system memory 190 (BIOS memory 190).

The touch display device includes a display module 160 and a touch panel 170 located on a front side face of the display module 160.

The system chipset 110 includes a south bridge chip and a north bridge chip for providing a bus to process data transmission between the elements. The CPU 120, the system memory 130, the fixed storage medium 140, the display interface 150, the display module 160, the touch panel 170, the thermal sensor 171, and the keyboard controller 180 are electrically connected to the system chipset 110. The structures and functions of the CPU 120, the system memory 130, the fixed storage medium 140, the display interface 150, and the display module 160 are substantially the same as those of an ordinary computer system, and the details will not addressed here bellow.

The touch panel 170 is overlaid on the display module 160 and is electrically connected to the system chipset 110, so as to be touched and generate a surface resistance which is transmitted to the CPU 120 via the system chipset 110. The CPU 120 executes a surface resistance-coordinate conversion procedure to convert the surface resistance into a coordinate. The thermal sensor 171 is disposed on the touch panel 170 for detecting a current temperature of the touch panel 170.

Figure 2:
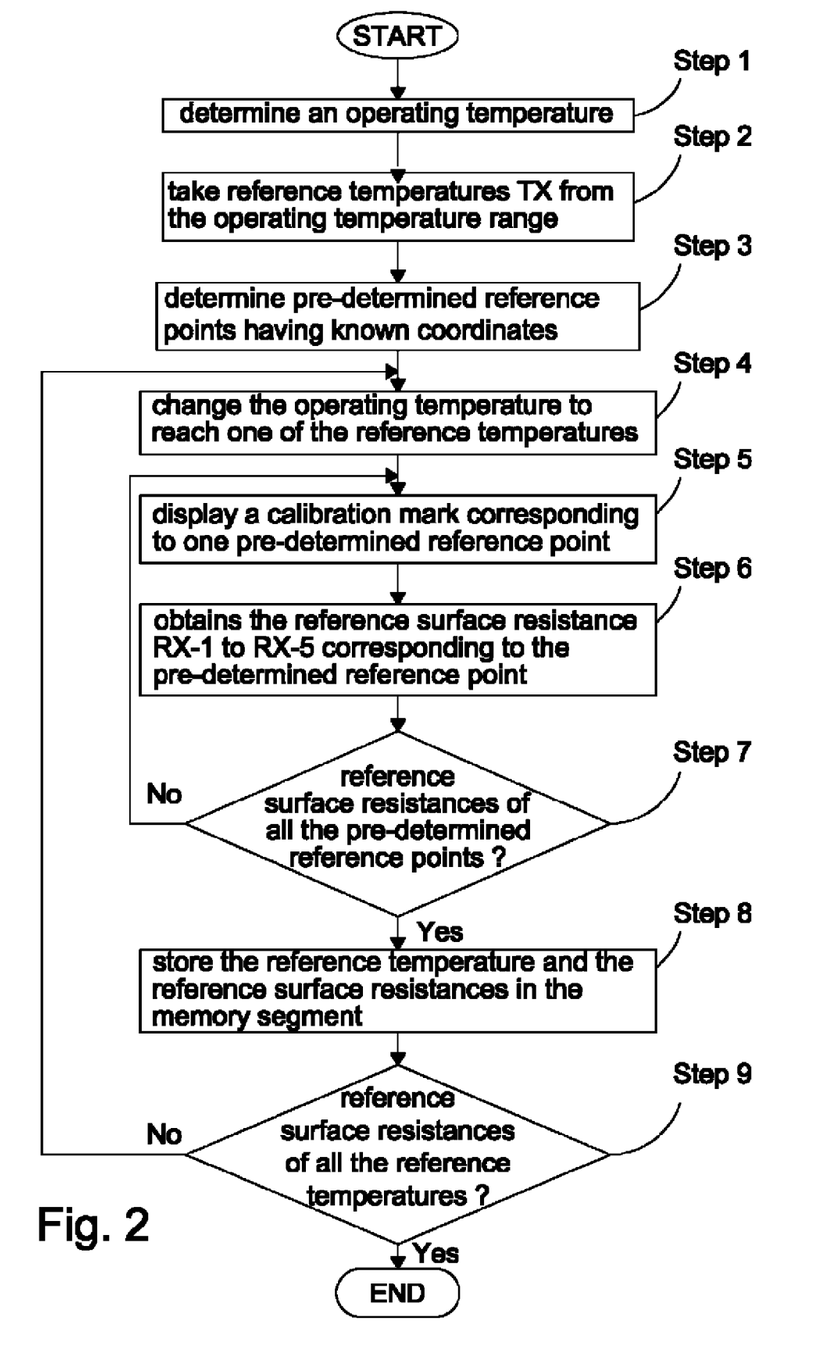
FIG. 2 is a flow chart of an ex-factory calibration procedure in the linear compensation method of a touch panel according to the embodiment of the present invention.
Figure 4:
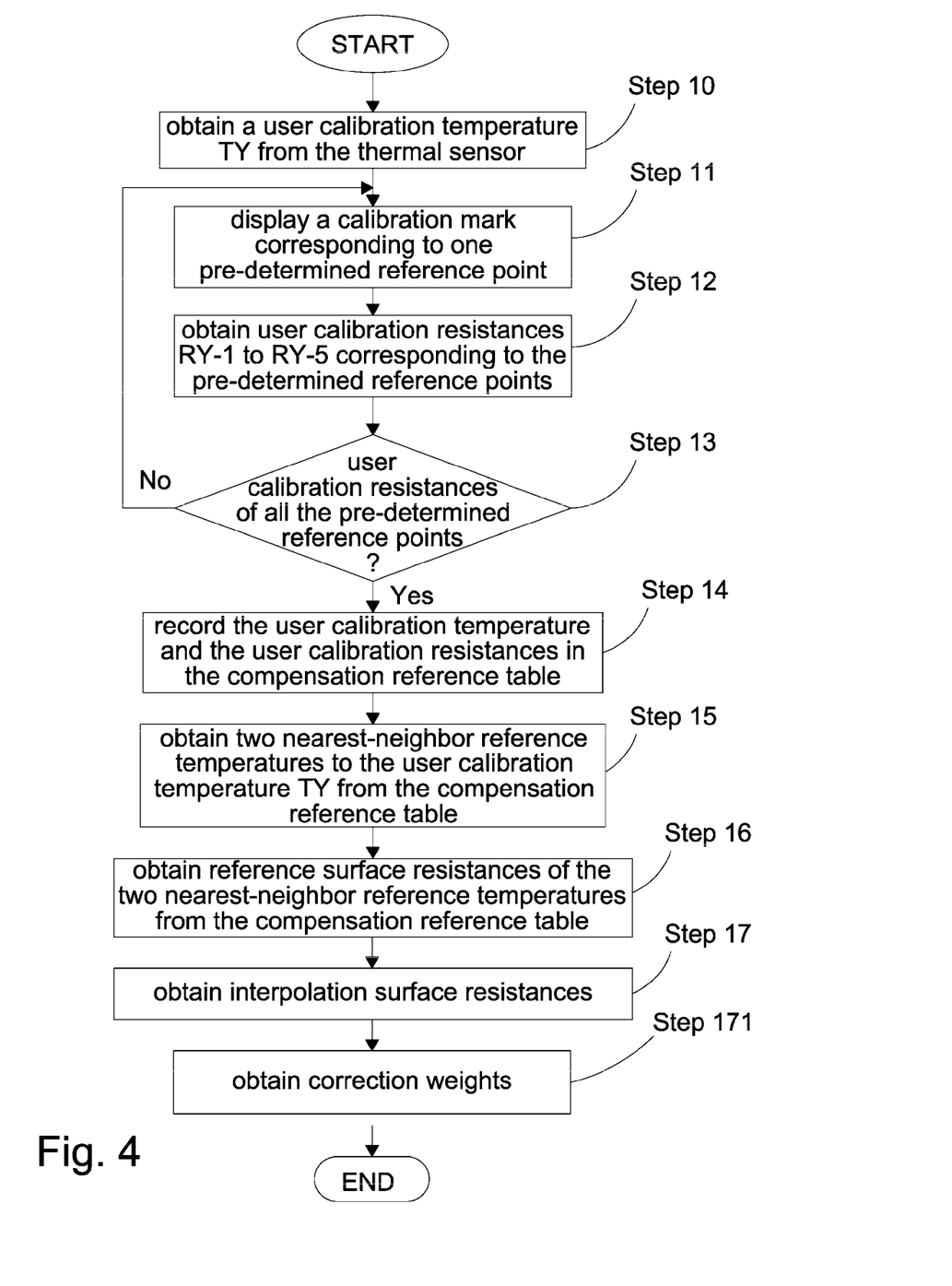
FIG. 4 is a flow chart of a user calibration process in the linear compensation method of a touch panel according to the embodiment of the present invention.
Figure 6:
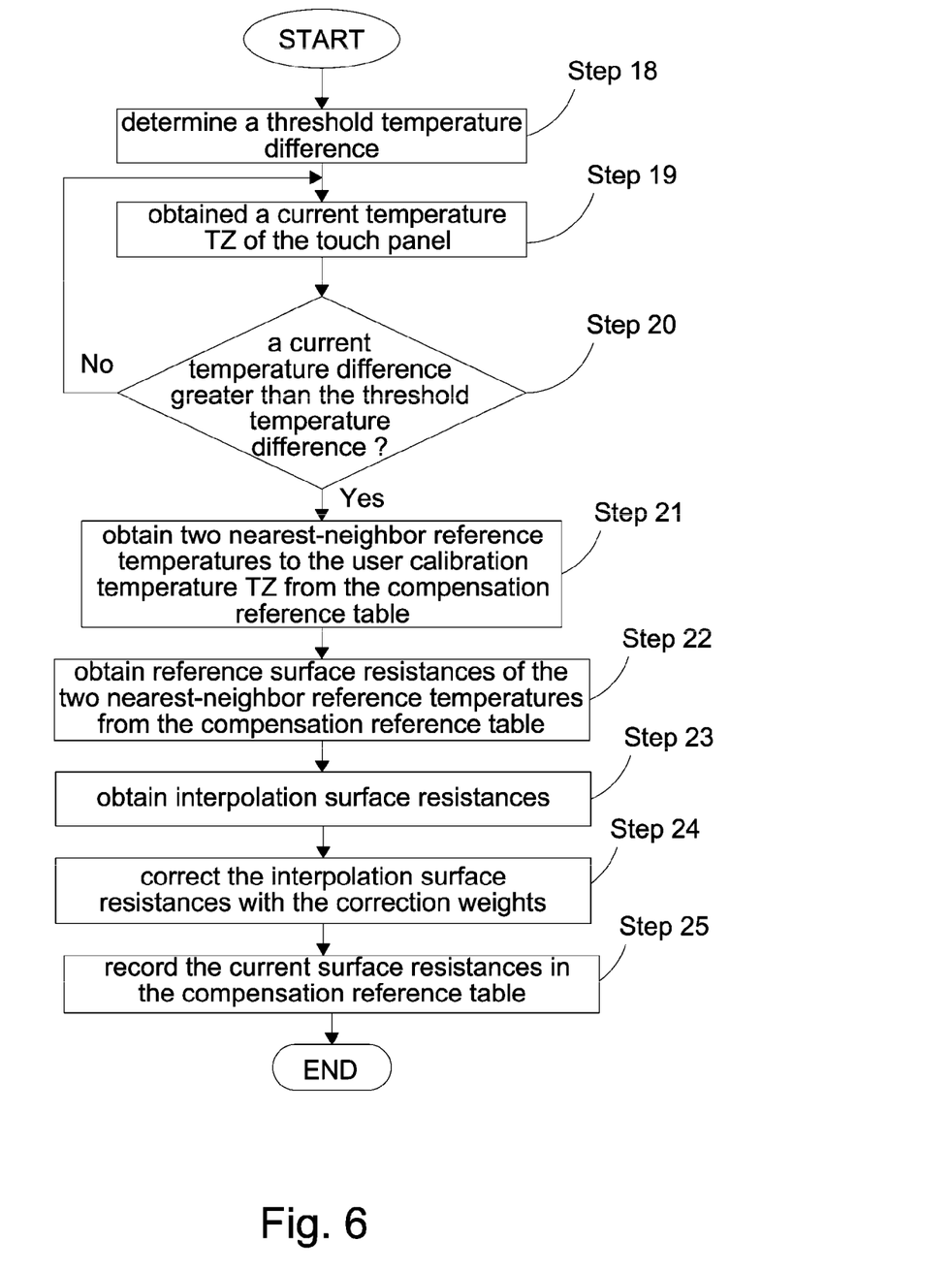
FIG. 6 is a flow chart of a current linear error correction procedure in the linear compensation method of a touch panel according to the embodiment of the present invention.

FIGS. 2, 4, and 6 show the linear compensation method of the touch panel according to the embodiment of the present invention. The method is applied to the aforementioned touch control computer system for correcting an output of the touch panel 170.

The linear compensation method of the touch panel includes an ex-factory calibration procedure, a user calibration procedure, and a current linear error correction procedure. First, the ex-factory calibration procedure is illustrated below. The ex-factory calibration procedure is performed after the touch panel 170 is installed in the touch control computer system.

Figure 3:
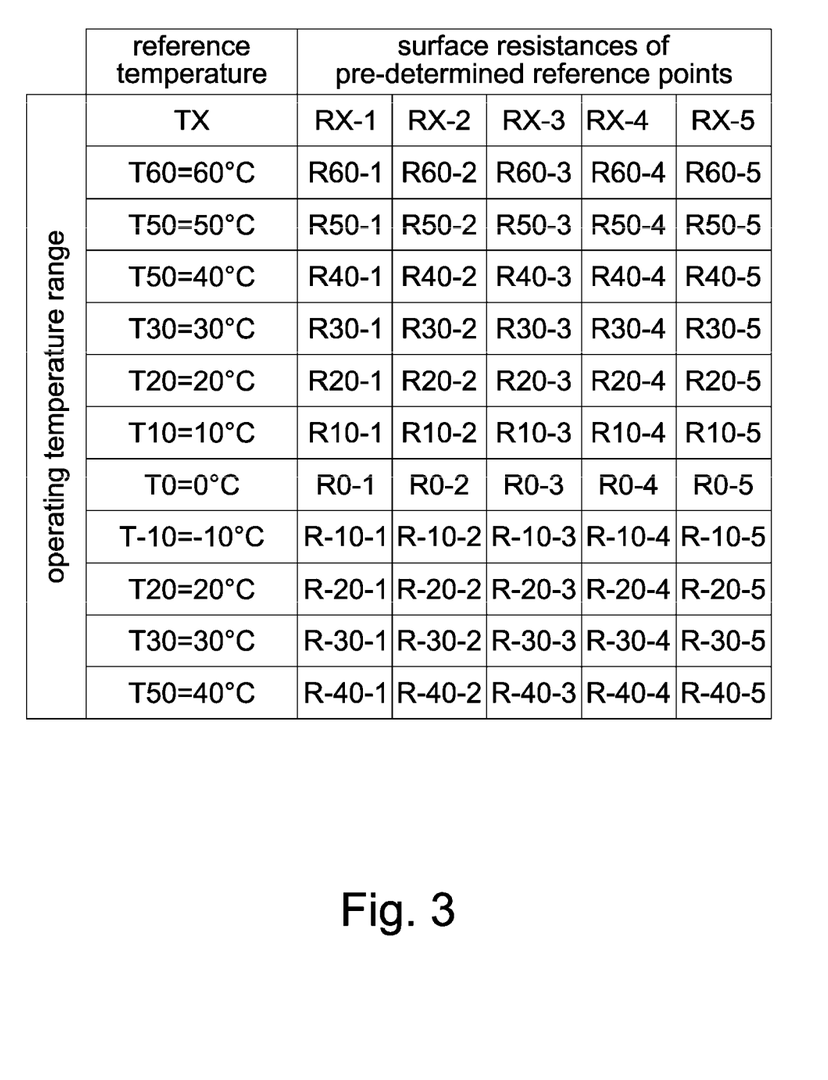
FIG. 3 is a compensation reference table provided in the linear compensation method of a touch panel according to the embodiment of the present invention.

Referring to FIGS. 2 and 3, in the ex-factory calibration procedure, an operating temperature range is first determined, and the operating temperature range is an ambient temperature range that may appear in the use of the touch control computer system 100, for example, 60° C. to –40° C. is determined as an operating temperature range (Step 1).

A plurality of reference temperatures Tx is taken from the operating temperature range, in which the reference temperatures have a fixed temperature difference (for example, 10° C.) from each other and contain two end points of the operating temperature range (Step 2).

Then, the CPU 120 of the touch control computer system loads a multi-point calibration procedure into the system memory 130 from the fixed storage medium 140 or the BIOS memory 190, and performs the multi-point calibration procedure to determine a plurality of pre-determined reference points having known coordinates, for example, five pre-determined reference points having known coordinates (Step 3).

An operating temperature of the touch panel 170 is changed to reach one of the reference temperatures, and the thermal sensor 171 monitors the operating temperature to determine whether the operating temperature reaches the reference temperature or not (Step 4).

As described above, the touch display device includes the display module 160 and the touch panel 170 overlaid on the front side face of the display module 160, such that the user may directly see the touch panel 170 located on the front side face of the display module 160 and view an image displayed by the display module 160 via the touch panel 170.

Afterwards, a calibration mark is displayed. Specifically, the CPU 120 drives the display module 160 of the touch display device to display a calibration mark at a position corresponding to one pre-determined reference point via the system chipset 110 and the display interface 150 based on the coordinate of the pre-determined reference point (Step 5).

The touch panel 170 is waited for to be touched to generate a reference surface resistance, and the CPU 120 obtains the reference surface resistance RX-1 corresponding to the pre-determined reference point from the touch panel 170 via the system chipset 110 and temporarily stores the value RX-1 in a memory segment (Step 6). The memory segment may be the system memory 130, the fixed storage medium 140, or the BIOS memory 190.

The CPU 120 again drives the display module 160 of the touch display to display a calibration mark at a position corresponding to another pre-determined reference point (Step 5), so as to acquire a reference surface resistance of the pre-determined reference point from the touch panel 170 (Step 6), thereby obtaining reference surface resistances RX-2, RX-3, RX-4, RX-5 of the other pre-determined reference points one by one.

The CPU 120 determines whether reference surface resistances of all the pre-determined reference points are obtained after obtaining every reference surface resistance (Step 7), and if not, continues obtaining reference surface resistances of the other pre-determined reference points; otherwise, performs the next step.

Referring to FIGS. 2 and 3, after obtaining the reference surface resistance of each of the pre-determined reference points, the CPU 120 stores the reference temperature and each reference surface resistance in the memory block, for example, the BIOS memory 190 or the fixed storage medium (Step 8).

Referring to FIG. 3, the aforementioned temperature and value may be recorded in a format as (TX, RX-1, RX-2, RX-3, RX-4, RX-5, . . . ), in which the reference temperature TX and the reference surface resistances RX-1 to RX-5 of the first to fifth reference coordinate points are stored in fields of each row. For example, data obtained at 60° C. may be recorded as (T60, R60-1, R60-2, R60-3, R60-4, R605, . . . ).

The CPU 120 determines whether the reference surface resistance of each reference temperature is obtained (Step 9). If not, the user is notified to change the operating temperature to reach one of the reference temperatures, for example, to change the operating temperature from 60° C. to 50° C., and the thermal sensor 171 monitors the operating temperature to determine whether the operating temperature reaches the reference temperature or not (Step 4); otherwise, the ex-factory calibration procedure is completed.

As shown in FIG. 3, a compensation reference table is formed by the data (TX, RX-1, RX-2, RX-3, RX-4, RX-5, . . . ) obtained at the reference temperatures. The compensation reference table includes a plurality of sets of data, each containing a reference temperature and reference surface resistances acquired for pre-determined reference points having known coordinates at the reference temperature.

Referring to FIG. 4, the touch control computer system goes through the user calibration process at least once when being used for the first time. The user calibration process may be provided once usually when the touch control computer system is used for the first time or reset, or performed by the user at any time.

As shown in FIG. 4, in the user calibration procedure, the CPU 120 first obtains a current temperature of the touch panel 170 of the touch display module 160 from the thermal sensor 171 as a user calibration temperature TY (Step 10). Then, the CPU 120 loads a multi-point calibration procedure into the system memory 130 from the fixed storage medium 140 or the BIOS memory 190 and performs the multi-point calibration procedure.

A calibration mark is displayed, in which the CPU 120 drives the display module 160 of the touch display device to display a calibration mark at a position corresponding to one pre-determined reference point via the system chipset 110 and the display interface 150 based on the coordinate of the pre-determined reference point (Step 11). The CPU 120 obtains a user calibration resistance RY-1 corresponding to the pre-determined reference point from the touch panel 170 via the system chipset 110 and temporarily stores the obtained value RY-1 in the system memory 130 (Step 12).

Afterwards, the CPU 120 again drives the display module 160 of the touch display to display a calibration mark at a position corresponding to another pre-determined reference point (Step 11), so as to obtain a user calibration resistance of the pre-determined reference point from the touch panel 170 (Step 12), thereby obtaining user calibration resistances RY-2, RY-3, RY-4, RY-5 of the other pre-determined reference points one by one.

The CPU 120 determines whether user calibration resistances of all the pre-determined reference points are acquired after obtaining every user calibration resistance (Step 13), and if not, continues obtaining user calibration resistances of the other pre-determined reference points; otherwise, records the user calibration temperature and the user calibration resistances in the compensation reference table (Step 14) and performs the next step.

The user calibration resistances RY-1, RY-2, RY-3, RY-4, RY-5 are surface resistances actually corresponding to the pre-determined reference points when the touch panel 170 is at the operating temperature TY. After the touch panel 170 outputs a surface resistance R, the CPU 120 performs a coordinate conversion procedure based on the user calibration resistances RY-1, RY-2, RY-3, RY-4, RY-5, the coordinates of the pre-determined reference points, and the surface resistance R output from the touch panel 170 to acquire a coordinate corresponding to the surface resistance R, i.e., to acquire a coordinate of a touch point on the touch panel 170.

Figure 5:
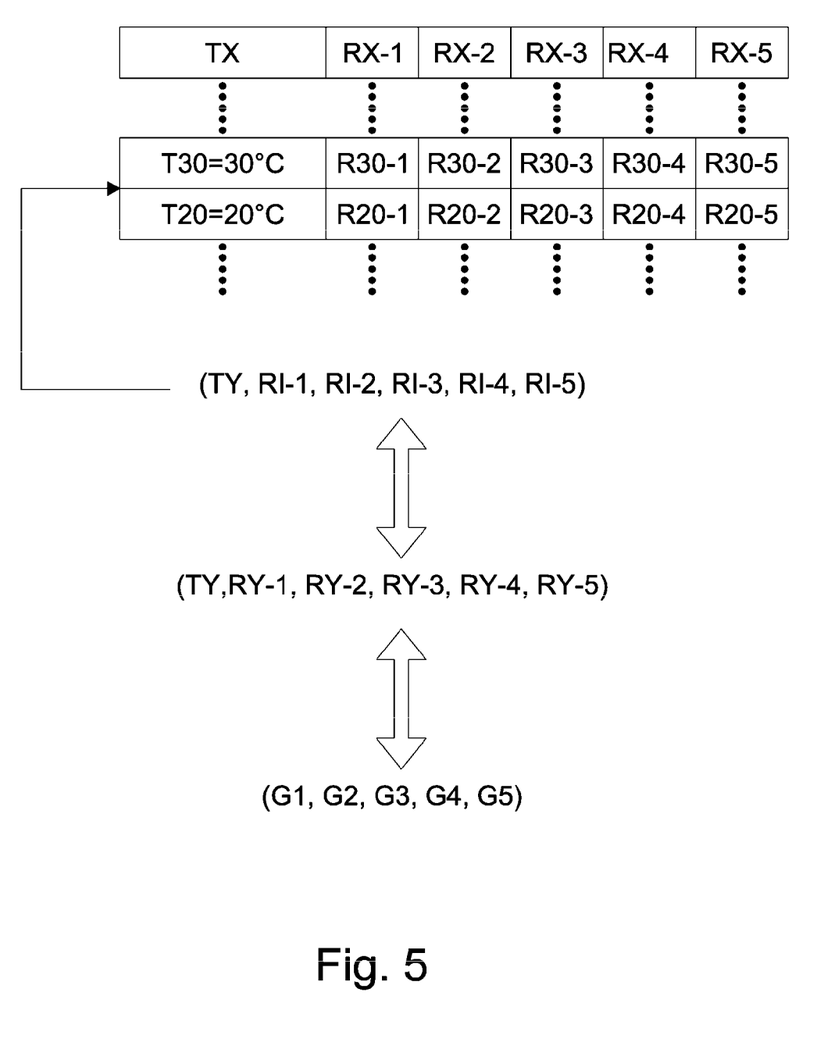
FIG. 5 is a schematic view illustrating the steps of obtaining interpolation surface resistances and correction weights in the user calibration procedure.

Next, referring to FIGS. 4 and 5, the CPU 120 obtains two nearest-neighbor reference temperatures to the user calibration temperature TY from the compensation reference table (Step 15). For example, if TY is 25° C., the two reference temperatures adjacent to TY are 20° C. and 30° C. Then, the CPU 120 obtains reference surface resistances corresponding to the two nearest-neighbor reference temperatures which are respectively 20° C. and 30° C. from the compensation reference table (Step 16). Here, TY is in a range of 20° C. to 30° C., which is taken as an example for illustration only, instead of limiting the two reference temperatures to be 20° C. and 30° C.

Interpolation surface resistances (RI-1, RI-2, RI-3, RI-4, RI-5) corresponding to the user calibration temperature TY are obtained from the compensation reference table through the two reference temperatures and the corresponding reference surface resistances thereof (Step 17). The interpolation surface resistance is a surface resistance of the pre-determined reference point acquired via the compensation reference table, but this surface resistance is different from an actual surface resistance, such that the surface resistance-coordinate conversion procedure obtains a wrong coordinate based on the interpolation surface resistance. Therefore, after the operating temperature of the touch panel 170 is changed, the interpolation surface resistance obtained from the compensation reference table must be corrected.

Afterwards, referring to FIGS. 4 and 5, the CPU 120 obtains correction weights (G1, G2, G3, G4, G5) and records the correction weights in the compensation reference table (Step 171). The correction weights are ratios of the user calibration resistances to the interpolation surface resistances, which are expressed in the following format:

$$(G1,G2,G3,G4,G5)=(RY\text{-}1/RI\text{-}1,RY\text{-}2/RI\text{-}2,RY\text{-}3/RI\text{-}3,RY\text{-}4/RI\text{-}4,RY\text{-}5/RI\text{-}5).$$

$$(G1,G2,G3,G4,G5)=(RY\text{-}1/RI\text{-}1,RY\text{-}2/RI\text{-}2,RY\text{-}3/RI\text{-}3,RY\text{-}4/RI\text{-}4,RY\text{-}5/RI\text{-}5).$$

In the use of the touch panel 170, the CPU 120 takes the user calibration resistances RY-1, RY-2, RY-3, RY-4, and RY-5 as operational basis of the surface resistance-coordinate conversion procedure. When the CPU 120 receives surface resistance R from the touch panel 170, the received surface resistance R and the user calibration resistances RY-1, RY-2, RY-3, RY-4, RY-5 are introduced into the surface resistance-coordinate conversion procedure, so as to obtain the corresponding coordinates. In addition, the CPU 120 determines whether to perform the current linear error correction procedure based on the current temperature.

Referring to FIG. 6, in the current linear error correction procedure, a threshold temperature difference is first determined (Step 18). The threshold temperature difference may be set by the user or pre-written in a driver and loaded into the memory segment (the system memory 130 or the BIOS memory 190) by the CPU 120.

Next, a current temperature TZ of the touch panel 170 is obtained by the thermal sensor 171 (Step 19) and then transferred to the CPU 120 via the system chipset 110.

The CPU 120 compares the current temperature TZ with the user calibration temperature TY to determine whether a current temperature difference between the current temperature TZ and the user calibration temperature TY is greater than the threshold temperature difference (Step 20).

If the current temperature difference between the current temperature TZ and the user calibration temperature TY is lower than the threshold temperature difference, the CPU 120 re-acquires a new current temperature TZ (Step 19). If the current temperature difference between the current temperature TZ and the user calibration temperature TY is greater than the threshold temperature difference, it indicates that the original user calibration resistances RY-1, RY-2, RY-3, RY-4, RY-5 are no longer applicable. At this time, current surface resistances of the pre-determined reference points at the current temperature TZ need to be obtained.

Figure 7:
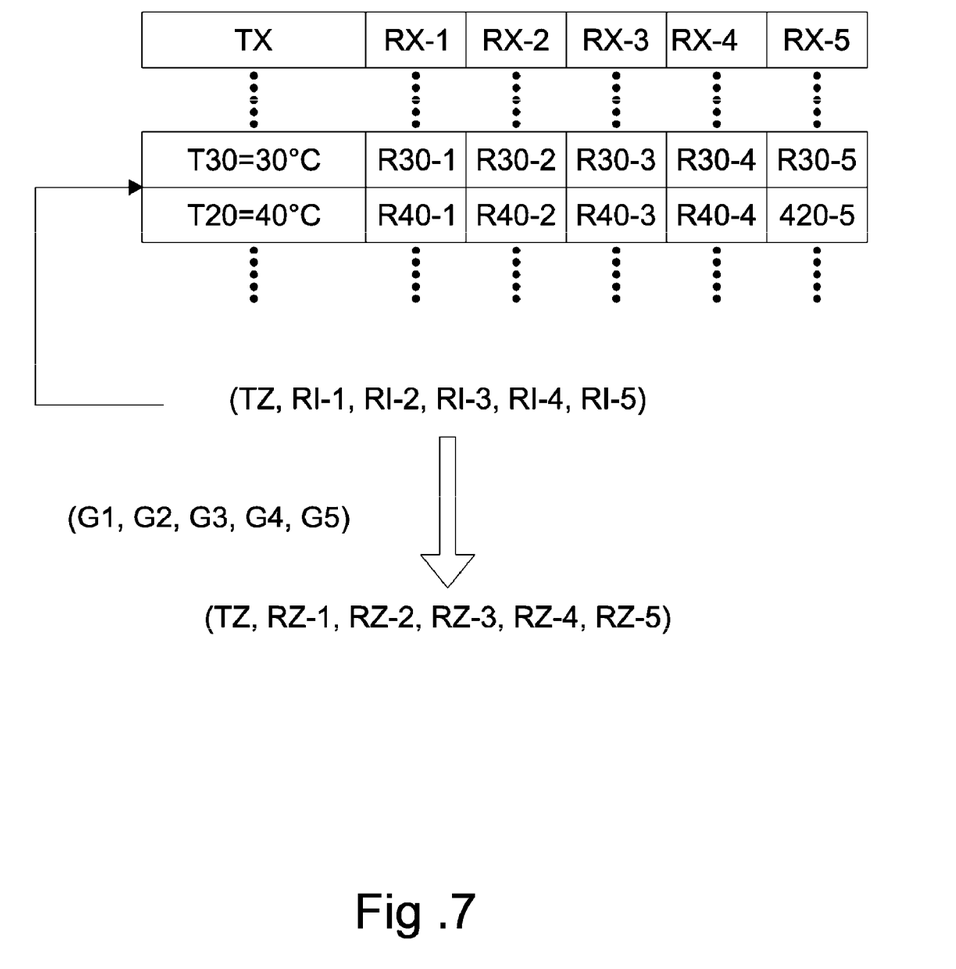
FIG. 7 is a schematic view illustrating the steps of obtaining of interpolation surface resistances and the correction of the interpolation surface resistances into current surface resistances with correction weights in the current linear error correction procedure.

Referring to FIGS. 6 and 7, the CPU 120 obtains two nearest-neighbor reference temperatures to the current temperature TZ from the compensation reference table (Step 21).

For example, if the user calibration temperature TY is 25° C. and the threshold temperature difference is 10° C., when the current temperature TZ reaches 36° C., the temperature difference between the user calibration temperature and the current temperature is greater than the threshold temperature difference. As a result, current surface resistances of the pre-determined reference points at the current temperature TZ need to be found out. At this time, the two reference temperatures adjacent to the current temperature TZ are respectively 30° C. and 40° C.

Then, the CPU 120 obtains reference surface resistances corresponding to the two reference temperatures which are respectively 30° C. and 40° C. from the compensation reference table (Step 22). Here, TZ is in a range of 30° C. to 40° C., which is taken as an example for illustration only, instead of limiting the two reference temperatures to be 30° C. and 40° C.

Interpolation surface resistances (RI-1, RI-2, RI-3, RI-4, RI-5) corresponding to the current temperature TZ are obtains from the compensation reference table through the two nearest-neighbor reference temperatures and the corresponding reference surface resistances thereof (Step 23).

Next, the interpolation surface resistances corresponding to the current temperature are corrected with the correction weights (Step 24) so as to obtain the current surface resistances (RZ-1, RZ-2, RZ-3, RZ-4, RZ-5) of the pre-determined reference points. The specific implementation is to multiply an array of the interpolation surface resistances (RI-1, RI-2, RI-3, RI-4, RI-5) by an array of the correction weights (G1, G2, G3, G4, G5) so as to obtain an array of the current surface resistances (RZ-1, RZ-2, RZ-3, RZ-4, RZ-5). The operational equation is as follows:

$$(RZ\text{-}1, RZ\text{-}2, RZ\text{-}3, RZ\text{-}4, RZ\text{-}5) = (RI\text{-}1, RI\text{-}2, RI\text{-}3, RI\text{-}4, RI\text{-}5) * (G1, G2, G3, G4, G5).$$

Finally, the CPU 120 records the current surface resistances RZ-1, RZ-2, RZ-3, RZ-4, RZ-5 in the compensation reference table (Step 25) to perform the surface resistance-coordinate conversion procedure based on the current surface resistances.

The current surface resistances RZ-1, RZ-2, RZ-3, RZ-4, RZ-5 are surface resistances actually corresponding to the pre-determined reference points and obtained by correcting the interpolation surface resistances acquired from the compensation reference table when the touch panel 170 is at the operating temperature TZ.

After the touch panel 170 outputs a surface resistance R, the CPU 120 performs the surface resistance-coordinate conversion procedure based on the current surface resistances RZ-1, RZ-2, RZ-3, RZ-4, RZ-5, the coordinates of the pre-determined reference points, and the surface resistance R output from the touch panel 170 to obtain a coordinate corresponding to the surface resistance R, i.e., to obtain a coordinate of a touch point on the touch panel 170.

In addition, when the current temperature difference between the current temperature TZ and the user calibration temperature TY is greater than the threshold temperature difference, the CPU 120 not only performs the procedure of obtaining the current surface resistances RZ-1, RZ-2, RZ-3, RZ-4, RZ-5, but also activates a prompt window to prompt the user whether to perform the user calibration process again, so as to update the user calibration temperature TY, the user calibration resistances RY-1, RY-2, RY-3, RY-4, RY-5, and the correction weights G1, G2, G3, G4, G5.

It is understood that, since the present invention mainly aims at preventing the user from repeatedly performing the user calibration process due to an excessively large temperature difference, the most preferred implementation aspect is for the system to perform the procedure of obtaining the current surface resistances RZ-1, RZ-2, RZ-3, RZ-4, RZ-5 itself based on the current temperature. In this manner, the linear error correction can be accomplished automatically without requiring the user to determine whether to perform the user calibration process based on the operating temperature variation or requiring the user to repeatedly perform the user calibration process as the operating temperature varies.

While the present invention has been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A linear compensation method, applicable to a touch control computer system comprising a system chipset, a central processing unit, a memory segment, an display interface, a display panel, a touch panel overlaid on a front side face of the display panel, and a thermal sensor disposed on the touch panel, the method comprising the steps of:

providing a compensation reference table stored in the memory block, wherein the compensation reference table comprises a plurality of sets of data, each set containing a reference temperature and reference surface resistances at pre-determined reference points having known coordinates at the reference temperature;

performing a user calibration process by the central processing unit to obtain the current temperature of the touch panel as a user calibration temperature via the thermal sensor, and to obtain user calibration resistances of the pre-determined reference points;

by the central processing unit, obtaining interpolation surface resistances corresponding to the user calibration temperature from the compensation reference table;

by the central processing unit, obtaining correction weights and recording the correction weights in the compensation reference table, wherein the correction weights are ratios of the user calibration resistances to the interpolation surface resistances;

by the central processing unit, deriving a current temperature of the touch panel by the thermal sensor, and obtaining interpolation surface resistances corresponding to the current temperature from the compensation reference table; and correcting the interpolation surface resistances corresponding to the current temperature by utilizing the correction weights to derive current surface resistances of the pre-determined reference points.

2. The linear compensation method as claimed in claim 1, wherein the step of obtaining each of the interpolation surface resistances corresponding to the user calibration temperature comprises the steps of:

by the central processing unit, obtaining two nearest-neighbor reference temperatures to the user calibration temperature from the compensation reference table;

by the central processing unit, obtaining reference surface resistances corresponding to the two nearest-neighbor reference temperatures from the compensation reference table; and by the central processing unit, obtaining the interpolation surface resistance corresponding to the user calibration temperature through the two reference temperatures and the corresponding reference surface resistances thereof.

3. The linear compensation method as claimed in claim 1, wherein the step of obtaining each of the interpolation surface resistance corresponding to the current temperature comprises the steps of:

by the central processing unit, obtaining two nearest-neighbor reference temperatures to the current temperature from the compensation reference table;

by the central processing unit, obtaining reference surface resistances corresponding to the two reference temperatures from the compensation reference table; and obtaining the interpolation surface resistance corresponding to the current temperature from the compensation reference table through the two nearest-neighbor reference temperatures and the corresponding reference surface resistances thereof.

4. The linear compensation method as claimed in claim 1, wherein after the step of obtaining the current temperature of the touch panel by the thermal sensor, the method further comprises the steps of:

by the central processing unit, obtaining the current temperature of the touch panel by the thermal sensor, and determining whether a current temperature difference between the current temperature and the user calibration temperature is greater than a threshold temperature difference; and if the current temperature difference is greater than the threshold temperature difference, obtaining interpolation surface resistances corresponding to the current temperature, and correcting the interpolation surface resistances corresponding to the current temperature with the correction weight so as to obtain a current surface resistance of each of the pre-determined reference points.

5. The linear compensation method as claimed in claim 4, further comprising the step of:

if the current temperature difference is lower than the threshold temperature difference, obtaining a current temperature of the touch panel again by the thermal sensor.

6. The linear compensation method as claimed in claim 4, further comprising the step of:

after the touch panel outputs a surface resistance, performing a resistance-coordinate conversion process by the central processing unit based on the current surface resistance, the coordinates of the pre-determined reference points, and the surface resistance to obtain a coordinate corresponding to the surface resistance.

7. The linear compensation method as claimed in claim 1, wherein the step of providing the compensation reference table comprises the step of:

determining an operating temperature range and obtaining a plurality of reference temperatures within the operating temperature range;

determining a plurality of pre-determined reference points having known coordinates;

changing an operating temperature of the touch panel to reach one of the reference temperatures, and monitoring the operating temperature by the thermal sensor to determine whether the operating temperature reaches the reference temperature or not;

driving the display panel by the central processing to display a calibration mark at a position corresponding to one pre-determined reference point via the system chipset and the display interface;

waiting for the touch panel to be touched to generate a reference surface resistance, and obtaining the reference surface resistance and storing the reference temperature and the reference surface resistances in the memory segment by the central processing via the system chipset; and repeating the previous two steps to obtain reference surface resistances of the other pre-determined reference points and store the acquired values in the memory block, so as to generate the compensation reference table.

8. The linear compensation method as claimed in claim 7, wherein the reference temperatures have a fixed temperature difference from each other, and the reference temperatures include two end points of the operating temperature range.

9. The linear compensation method as claimed in claim 1, wherein the user calibration process comprises the steps of:

by the central processing unit, driving the display panel to display a calibration mark at a position corresponding to one pre-determined reference point via the system chipset and the display interface;

waiting for the touch panel to be touched to generate a user calibration resistance, and obtaining the reference surface resistance and storing the user calibration temperature and the user calibration resistances in the memory segment by the central processing unit via the system chipset; and repeating the previous two steps to obtain user calibration resistances of the other pre-determined reference points.

* * * * *